UNITED STATES PATENT OFFICE.

SAMUEL S. SADTLER, OF SPRINGFIELD, PENNSYLVANIA.

PROCESS FOR THE MANUFACTURE OF NITROSTARCH.

1,211,761.     Specification of Letters Patent.     Patented Jan. 9, 1917.

No Drawing.     Application filed January 31, 1916. Serial No. 75,236.

*To all whom it may concern:*

Be it known that I, SAMUEL S. SADTLER, a citizen of the United States, and a resident of Springfield, Montgomery county, Pennsylvania, have invented a new and useful Process for the Manufacture of Nitrostarch, of which the following is a specification.

This invention is an improved process of manufacturing nitro-starch by which it is given a notable stability combined with the character of a high explosive.

I am aware that nitro-starch of high explosive qualities, similar to those possessed by nitro-cellulose or gun cotton, has been prepared repeatedly and described in various patents and publications, but after repeated trials its use has been found impracticable because of its instability as hitherto obtained by the known processes of production. The earlier processes, such as those of Uchatius and the Nobel Co., dissolved starch in strong nitric acid, and then either poured the liquid into sulfuric acid or sprayed it into mixed nitric and sulfuric acid. But the efforts to use the product were abandoned after thorough trial because such product was found to lack the necessary stability for practical purposes. In the process patented by Moffatt, it was sought to produce a stable product by eliminating the moisture from the starch, treating the dried product in a nitrating bath at a sufficiently low temperature to prevent the rupture of the starch granules, and then washing and neutralizing. This process failed, however, to produce a commercially practicable product. In the later process patented by Hough, it was proposed to inject powdered starch, by means of an air jet, into mixed acid containing an excess of oleum (fuming sulfuric acid) and then treat the nitrated product, after filtration, with hot ammonia, but this product was also found to be unstable.

My invention is characterized by a distinct departure from these procedures. I have found that even the finest commercial grades of starch require special purifying treatment to adapt them for the production of stable nitrate esters, and that even then it is important that the nitrated starch receive, in addition, a specially devised washing treatment to give it the desired stability.

My invention, therefore, may be divided into two parts comprising, first, the preparation of the starch for nitration, and, second, the thorough elimination of all the impurities introduced by the nitrating mixture.

I will illustrate the nature of my invention by the following detailed account of the treatment of a high-grade commercial corn starch, but it is to be understood that I do not restrict myself to this special variety of starch as my raw material and that the proportions of reagents, times of treatment and details of the operations may be varied within the scope of my invention.

In the first part of the specified treatment, the starch in fine powdered form is, first, treated for from two to four hours in the cold with a one and one-half per cent. solution of sodium hydroxid or equivalent alkali in amount equaling approximately two per cent. of the weight of starch taken, which clears out any traces of oil present, swells the starch granules and removes protein matter. Then the starch is rinsed with several waters to remove the products of the alkali reaction. Next, it is treated with approximately two per cent. of bleaching powder (calcium hypochlorite) in clear solution for from one to two hours with continued agitation to effect the oxidation of impurities. Thereafter the product is washed thoroughly by using say six wash waters, preferably an intermediate water being soured with a little hydrochloric acid. This washed product is dried, powdered to 100 mesh and again sharply dried. In the second part of the specified treatment, this specifically purified starch is to be nitrated, and, as an example of nitration producing a nitro-starch of 13.5% N. strength, I proceed as follows: The starch ready for nitration is gradually entered into a bath composed of sulfuric acid 65%, nitric acid 25%, and water 10%, the total weight of liquid making up about 25 to 30 times the weight of the starch taken. This batch is kept at about 25 degrees C. for not to exceed 24 hours, and acid removed mechanically as by suction or centrifugation. The nitrated product has further adhering acid washed out and while still showing an acid reaction is boiled 4 or 5 times for fifteen minute periods, with water or steam. Sodium carbonate is then added to slight, but distinct, alkaline reaction and the solution again boiled for fifteen minutes, maintaining alkalinity. The product is now washed thoroughly with hot water for some eight hours.

It is then washed for 24 hours at the ordinary temperature with very dilute ammonia solution, the washing being conducted slowly so as to allow the penetration of the reagent into the granules of the nitro-starch powder. This product is finally washed for about eight hours, with pure water and then dried.

Having described my invention, I claim:

1. The process of manufacturing nitro-starch which comprises treating starch with an oxidizing agent capable of liberating nascent oxygen to remove impurities and nitrating the purified starch.

2. The process of manufacturing nitro-starch which comprises treating starch with an alkali solution adapted for removing oil and protein matter and with an oxidizing agent capable of liberating nascent oxygen to remove remaining impurities, and thereafter nitrating the purified starch.

3. The process of manufacturing nitro-starch which comprises treating starch with an alkali solution adapted for swelling it and removing impurities, washing out the dissolved impurities, treating the washed product with an oxidizing agent capable of liberating nascent oxygen to remove further impurities and thereafter nitrating the purified starch.

4. The process of manufacturing nitro-starch which comprises treating starch with a solution of sodium hydroxid adapted for removing impurities, washing out the dissolved impurities, treating the washed product with an oxidizing agent capable of liberating nascent oxygen to remove further impurities, washing this product, and nitrating this washed product.

5. The process of manufacturing nitro-starch which comprises treating starch for the removal of impurities, nitrating the product of the purifying treatment, removing excess acid and boiling in the presence of a slight amount of residual acid.

6. The process of manufacturing nitro-starch which comprises nitrating the starch, boiling the nitrated product in the presence of a slight amount of residual acid, and washing with a dilute alkali solution that will attack incompletely nitrated starch without destroying the fully nitrated product.

7. The process of manufacturing nitro-starch which comprises treating starch with a weak solution of sodium hydroxid, washing out the products of the reaction, treating with a weak hypochlorite solution, washing out further products of reaction, drying and powdering the washed product, nitrating the dried and powdered product, removing the excess acid from the nitrated product, and boiling to a condition of stability the product from which the excess acid has been removed.

8. The process of manufacturing nitro-starch which comprises treating starch with a weak alkali solution adapted for removing impurities, washing out the products of the reaction, treating with a weak oxidizing solution adapted for removing further impurities, washing out the reaction products due to oxidation, drying and powdering the resulting washed product, nitrating the powdered product, removing the excess acid from the nitrated product, and washing and boiling the product having the excess acid removed until said product shows stability.

9. The process of manufacturing nitro-starch which comprises nitrating the starch, boiling the nitrated product in the presence of a slight amount of residual acid, and boiling with a dilute alkali carbonate solution that will attack incompletely nitrated starch without destroying the fully nitrated product.

In testimony whereof, I have hereunto set my name this 29th day of January, 1916.

SAMUEL S. SADTLER.